United States Patent
Wang

(10) Patent No.: US 11,144,743 B2
(45) Date of Patent: Oct. 12, 2021

(54) ULTRASONIC FINGERPRINT SENSOR AND OPERATION METHOD THEREOF

(71) Applicant: Egis Technology Inc., Taipei (TW)

(72) Inventor: Di Bao Wang, Taipei (TW)

(73) Assignee: Egis Technology Inc., Hsinchu (TW)

( * ) Notice: Subject to any disclaimer, the term of this patent is extended or adjusted under 35 U.S.C. 154(b) by 0 days.

(21) Appl. No.: 17/037,701

(22) Filed: Sep. 30, 2020

(65) Prior Publication Data

US 2021/0142024 A1    May 13, 2021

Related U.S. Application Data

(60) Provisional application No. 62/933,984, filed on Nov. 12, 2019.

(30) Foreign Application Priority Data

Sep. 3, 2020   (CN) .......................... 202010916051.4

(51) Int. Cl.
| | | |
|---|---|---|
| *G06K 9/20* | (2006.01) | |
| *G06K 9/00* | (2006.01) | |
| *G06T 7/13* | (2017.01) | |
| *G10K 11/34* | (2006.01) | |

(52) U.S. Cl.
CPC ....... *G06K 9/0002* (2013.01); *G06K 9/00053* (2013.01); *G06T 7/13* (2017.01); *G10K 11/346* (2013.01)

(58) Field of Classification Search
CPC .......................... G06K 9/0002; G06K 9/00053
See application file for complete search history.

(56) References Cited

U.S. PATENT DOCUMENTS

| | | | | |
|---|---|---|---|---|
| 2016/0313439 | A1* | 10/2016 | Min | .................... G06K 9/0002 |
| 2017/0343341 | A1* | 11/2017 | Pang | ........................ G01B 7/06 |
| 2019/0325185 | A1 | 10/2019 | Tang | |
| 2020/0050307 | A1* | 2/2020 | Kuo | ....................... G06F 3/0412 |
| 2020/0201459 | A1* | 6/2020 | Withers | .................. G06F 3/047 |

FOREIGN PATENT DOCUMENTS

| | | |
|---|---|---|
| CN | 209297322 | 8/2019 |
| TW | M582162 | 8/2019 |

* cited by examiner

*Primary Examiner* — Brian Werner
(74) *Attorney, Agent, or Firm* — JCIPRNET

(57) ABSTRACT

An ultrasonic fingerprint sensor and an operation method thereof are provided. The ultrasonic fingerprint sensor is adapted to be disposed under a panel of a terminal device. The ultrasonic fingerprint sensor includes an ultrasonic fingerprint sensing array and a controller. The ultrasonic fingerprint sensing array transmits a test ultrasonic signal toward the panel. The controller is coupled to the ultrasonic fingerprint sensing array. The controller determines whether a protective layer is attached to a top of the panel based on a number of echo signals corresponding to the test ultrasonic signal.

34 Claims, 6 Drawing Sheets

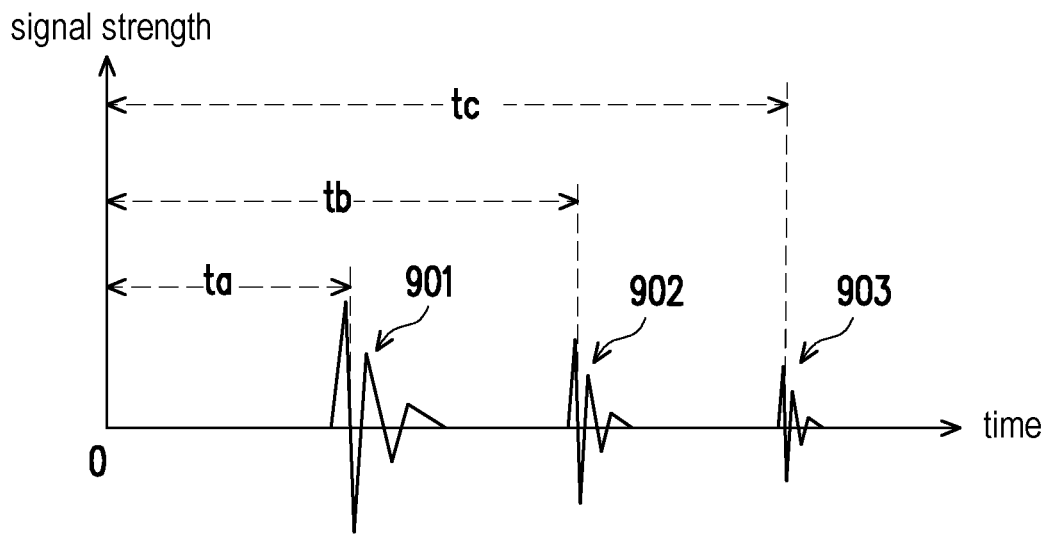
FIG. 9
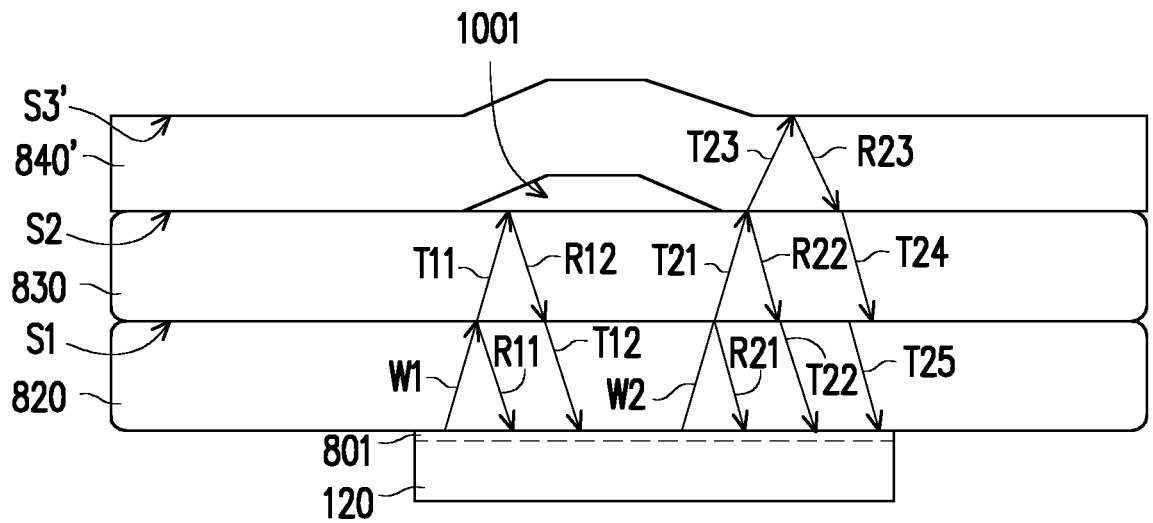
FIG. 10
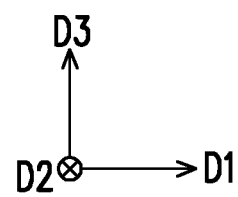

ULTRASONIC FINGERPRINT SENSOR AND OPERATION METHOD THEREOF

CROSS-REFERENCE TO RELATED APPLICATION

This application claims the priority benefit of U.S. provisional application Ser. No. 62/933,984, filed on Nov. 12, 2019, and China application serial no. 202010916051.4, filed on Sep. 3, 2020. The entirety of each of the above-mentioned patent applications is hereby incorporated by reference herein and made a part of this specification.

BACKGROUND

Technical Field

The disclosure is related to a sensor, and more particularly to, an ultrasonic fingerprint sensor and an operation method thereof.

Description of Related Art

Users usually attach protective stickers to the panels (e.g., display panels or touch panels, etc.) of mobile electronic devices (e.g., mobile phones or tablets) to protect the panels from scratches and damage. Since the protective sticker may be unevenly attached to the panel, or the thickness of the protective sticker is too thick, air bubbles may exist between the protective sticker and the panel. For mobile electronic devices with ultrasonic fingerprint sensing function, if the protective sticker on the panel above the ultrasonic fingerprint sensor is not evenly attached, the ultrasonic fingerprint sensor is not able to effectively sense fingerprints, leading to incorrect fingerprint identification.

SUMMARY

In view of this, the disclosure provides an ultrasonic fingerprint sensor and an operation method thereof, capable of automatically determining whether a protective layer is additionally attached to the top of the panel.

An ultrasonic fingerprint sensor of the disclosure is adapted to be disposed under a panel of a terminal device. The ultrasonic fingerprint sensor includes an ultrasonic fingerprint sensing array and a controller. The ultrasonic fingerprint sensing array is adapted to transmit a test ultrasonic signal toward the panel. The controller is coupled to the ultrasonic fingerprint sensing array. The controller determines whether a protective layer is attached to the top of the panel based on the number of echo signals corresponding to the test ultrasonic signal.

The operation method of the ultrasonic fingerprint sensor of the disclosure includes the following steps. A test ultrasonic signal is transmitted toward the panel through the ultrasonic fingerprint sensing array, it is determined that a protective layer is not additionally attached to the top of the panel when the ultrasonic fingerprint sensing array only receives a first echo corresponding to the test ultrasonic signal, and it is determined whether the protective layer is attached to the top of the panel based on the number of the echo signals corresponding to the test ultrasonic signal.

Based on the above, the ultrasonic fingerprint sensor and the operating method thereof in the disclosure are capable of determining whether the protective layer is attached to the top of the panel based on the number of the echo signals corresponding to the test ultrasonic signal (the ultrasound) in an effective manner.

In order to make the aforementioned features and advantages of the disclosure comprehensible, embodiments accompanied with drawings are described in detail below.

BRIEF DESCRIPTION OF THE DRAWINGS

FIG. 9 is a signal timing diagram of the first echo, the second echo, and the third echo according to an embodiment of the disclosure.

FIG. 10 is a schematic view of an ultrasonic fingerprint sensor and a multiple-layered panel attached with a protective layer according to another embodiment of the disclosure.

DESCRIPTION OF THE EMBODIMENTS

Figure 1:
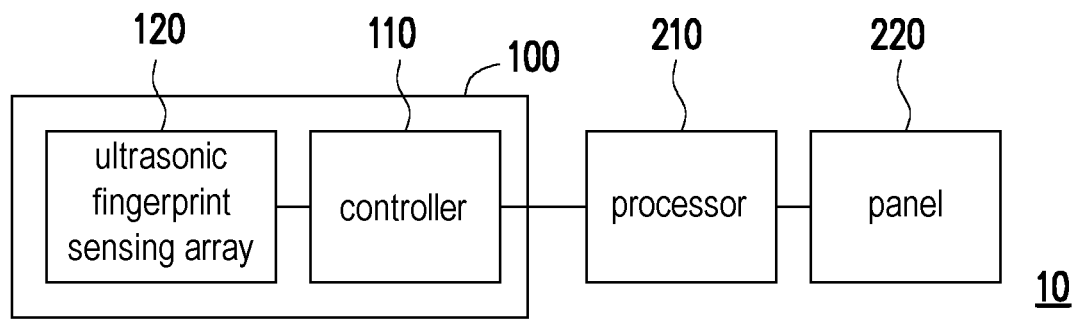
FIG. 1 is a schematic view of a terminal device according to an embodiment of the disclosure.

In order to make the content of the disclosure easier to understand, the following specific embodiments are illustrated as examples of the actual implementation of the disclosure. In addition, wherever possible, elements/components/steps with the same reference numerals in the drawings and embodiments represent the same or similar parts.

FIG. 1 is a schematic view of a terminal device according to an embodiment of the disclosure. Referring to FIG. 1, a terminal device 10 includes an ultrasonic fingerprint sensor 100, a processor 210, and a panel 220. The ultrasonic fingerprint sensor 100 includes a controller 110 and an ultrasonic fingerprint sensing array 120. The controller 110 is coupled to the ultrasonic fingerprint sensing array 120 and the processor 210. The processor 210 is coupled to the panel 220. The ultrasonic fingerprint sensing array 120 may include a plurality of ultrasonic sensors arranged in an array. In the embodiment, the terminal device 10 may be, for example, a mobile phone, a tablet, or other devices providing fingerprint sensing; and the processor 210 may be, for example, a central processing unit (CPU) of the terminal device 10. The panel 220 is a display panel. The processor 210 is adapted to execute fingerprint sensing applications and is capable of controlling the panel 220 to be operated to display a background mode, a general display mode, or other modes. In the embodiment, the ultrasonic fingerprint sensor 100 is adapted to be disposed under the panel 220 of the terminal device 10 to provide an under-screen fingerprint sensing function.

The controller 110 may be, for example, a programmable general-purpose or special-purpose microprocessor, a digital signal processor (DSP), a programmable controller, an application specific integrated circuit (ASIC), a graphics processing unit (GPU), other similar elements, or a combination thereof. The controller 110 is coupled to a storage medium and the ultrasonic fingerprint sensing array 120. The controller 110 is adapted to control the ultrasonic fingerprint sensing array 120 to implement fingerprint sensing and determine whether a protective layer is additionally attached to the top of the panel. The controller 110 makes it possible to respectively receive one or more echo signals output by the ultrasonic sensor in the same sensing event and implements the data calculation and signal output functions proposed by the disclosure through a special physical circuit design, such as multiple switching circuits, multiple arithmetic logic circuits, and other functional circuits.

Figure 2A:
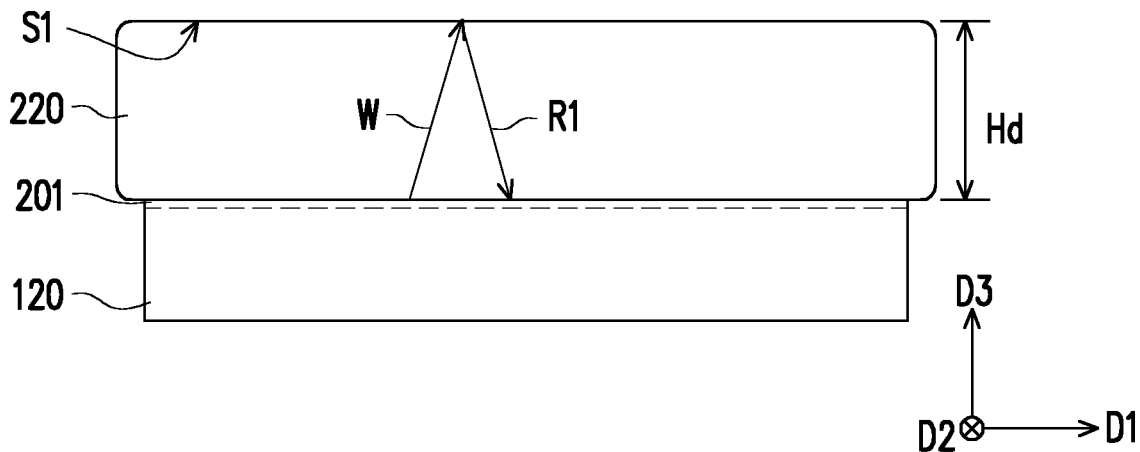
FIG. 2A is a schematic view of an ultrasonic fingerprint sensor and a panel without a protective layer according to an embodiment of the disclosure.
Figure 2B:
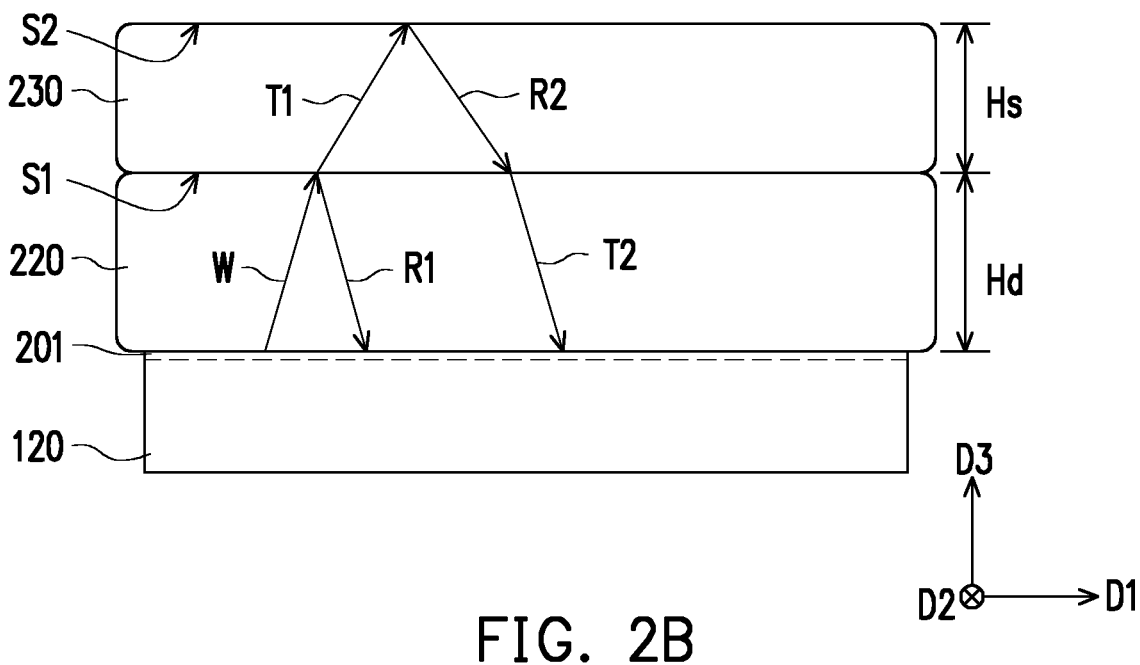
FIG. 2B is a schematic view of an ultrasonic fingerprint sensor and a panel attached with a protective layer according to an embodiment of the disclosure.
Figure 3:
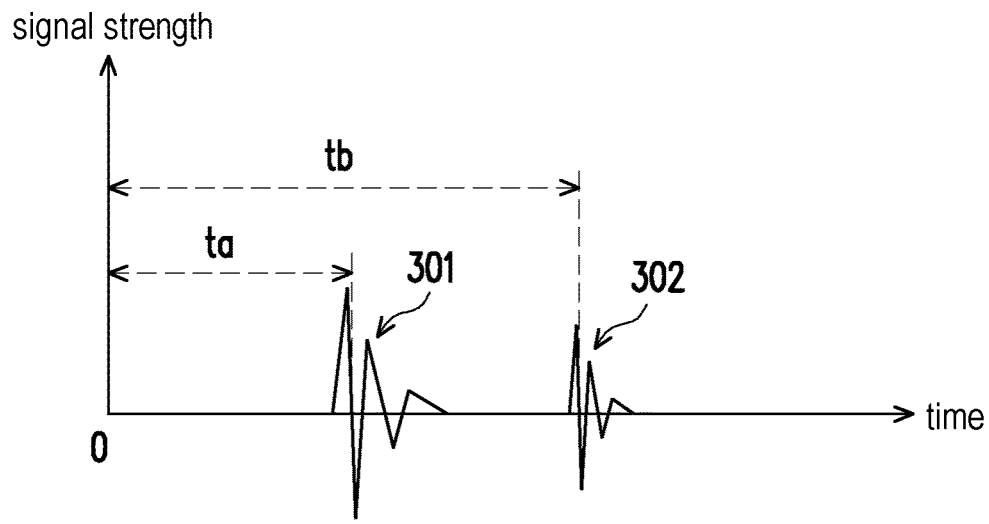
FIG. 3 is a signal timing diagram of the first echo and the second echo according to an embodiment of the disclosure.

FIG. 2A is a schematic view of an ultrasonic fingerprint sensor and a panel without a protective layer according to an embodiment of the disclosure. FIG. 2B is a schematic view of an ultrasonic fingerprint sensor and a panel attached with a protective layer according to an embodiment of the disclosure. FIG. 3 is a signal timing diagram of the first echo and the second echo according to an embodiment of the disclosure. Referring to FIG. 1, FIG. 2A, and FIG. 3, the ultrasonic fingerprint sensing array 120 is disposed under the panel 220 through an adhesive layer 201. The panel 220 is parallel to a plane defined by extending directions D1 and D2. No protective layer (or called a protective sticker) is additionally attached to the top of the panel 220 in the embodiment. In the embodiment, the ultrasonic fingerprint sensing array 120 transmits a test ultrasonic signal W (an ultrasonic signal) toward a direction D3, and a surface S1 of the panel 220 reflects a part of the test ultrasonic signal W to form a reflected signal R1 (a reflected sound wave). The reflected signal R1 is transmitted through the panel 220 and the adhesive layer 201 to the ultrasonic fingerprint sensing array 120 as a first echo.

In the embodiment, since the finger of a user is not placed or pressed above the panel 220 (i.e., air is above the panel 220), another part of the test ultrasonic signal W passes through the panel 220 and diverges. In other words, the ultrasonic fingerprint sensing array 120 only receives one echo (the first echo) represented by the reflected signal R1, and the controller 110 only receives a first echo signal 301 (shown in FIG. 3) provided by the ultrasonic fingerprint sensing array 120.

Referring to FIG. 1, FIG. 2B, and FIG. 3, a protective layer 230 (or a protective sticker) is additionally attached to the top of the panel 220 in the embodiment. In the embodiment, the ultrasonic fingerprint sensing array 120 transmits the test ultrasonic signal W toward the direction D3, and the surface S1 of the panel 220 reflects a part of the test ultrasonic signal W to form the reflected signal R1. The reflected signal R1 is transmitted through the panel 220 and the adhesive layer 201 to the ultrasonic fingerprint sensing array 120 as the first echo. In the embodiment, the protective layer 230 is additionally attached to the top of the panel 220, another part of the test ultrasonic signal W passes through the panel 220 and forms a penetrating signal T1 (a penetrating sound wave) transmitted to the protective layer 230, and a surface S2 of the protective layer 230 reflects a part of the penetrating signal T1 to form a reflected signal R2. The reflected signal R2 passes through the protective layer 230, and a part of the reflected signal R2 passes through the panel 220 to generate a penetrating signal T2. The penetrating signal T2 is transmitted through the panel 220 and the adhesive layer 201 to the ultrasonic fingerprint sensing array 120 as the second echo. In the embodiment, the protective layer 230 may be made of high-hardness plastic or glass.

In other words, comparing the embodiments of FIG. 2A and FIG. 2B, it can be seen that if the ultrasonic fingerprint sensing array 120 receives two echoes (the first echo represented by the reflected signal R1 and the second echo represented by the penetrating signal T2) in sequence (in a time-sharing manner) as shown in FIG. B and provides the first echo and the second echo (e.g., the first echo signal 301 and the second echo signal 302 shown in FIG. 3) to the controller 110 in sequence (in a time-sharing manner), this means that the protective layer 230 is additionally attached to the top of the panel 220. It can be understood that the signal amplitude of the first echo signal 301 is greater than or equal to the signal amplitude of the second echo signal 302. Conversely, if the ultrasonic fingerprint sensing array 120 as shown in FIG. 2A only receives one echo (the first echo represented by the reflected signal R1) and only provides the first echo signal 301 to the controller 110, this means that the protective layer 230 is not additionally attached to the top of the panel 220. Therefore, the controller 110 effectively determines whether the protective layer 230 is additionally attached to the top of the panel 220 based on the number of the echo signals corresponding to the test ultrasonic signal W.

Moreover, in the embodiment, the controller 110 further calculates a thickness Hs of the protective layer 230. Specifically, as shown in FIG. 2B and FIG. 3, the time difference ta is between the time when the ultrasonic fingerprint sensing array 120 transmits the test ultrasonic signal W and the time when the first echo is received and the first echo signal 301 is generated. The time difference tb is between the time when the ultrasonic fingerprint sensing array 120 transmits the test ultrasonic signal W and the time when the second echo is received and the second echo signal 302 is generated. The controller 110 calculates the thickness Hs of the protective layer 230 according to the time difference ta of when the first echo is received by the ultrasonic fingerprint sensing array 120 and the time difference tb of when the second echo received by the ultrasonic fingerprint sensing array 120. Note that since the thickness of the adhesive layer 201 is much less than that of the panel 220 and that of the protective layer 230, the influence of the thickness of the adhesive layer 201 is ignored in the following calculation. In the embodiment, the controller 110 may perform calculations, such as performing a de-simultaneous equation calculation according to the following equations (1) and (2), so that time td required for the sound wave to be transmitted from one surface of the panel 220 to another surface is obtained, and time is required for the sound wave to be transmitted from one surface of the protective layer 230 to another surface is obtained. Next, the controller 110 may perform calculations to calculate a thickness Hd of the panel 220 and the thickness Hs of the protective layer 230 according to the following equations (3) and (4), for example. A parameter cd is the transmission speed of the sound wave in the panel 220. A parameter cs is the transmission speed of the sound wave in the protective layer 230. The parameter cd and the parameter cs are pre-stored in the controller 110.

$$ta = 2 \times (td + ts) \qquad \text{equation (1)}$$

$$tb = 2 \times td \qquad \text{equation (2)}$$

$$Hd = td \times cd \qquad \text{equation (3)}$$

$$Hs = ts \times cs \qquad \text{equation (4)}$$

In the embodiment, the controller 110 updates or adjusts the phase-delay parameter of the ultrasonic fingerprint sensing array 120 for transmitting beamforming according to the thickness Hd of the protective layer 230, so that the ultrasonic fingerprint sensor 100 performs an adaptive operation to the thickness Hd of the protective layer 230 to provide an accurate ultrasonic fingerprint sensing effect. In addition, in order to prevent the thickness of the protective layer 230 additionally attached to the top of the panel 220 by the user from being too thick, which seriously affects the ultrasonic fingerprint sensing effect, in one embodiment, the controller 110 also determines whether the thickness of the protective layer 230 is greater than the thickness threshold and outputs a warning signal to the processor 210 so that the terminal device 10 gives a warning to remind the user.

Figure 4:
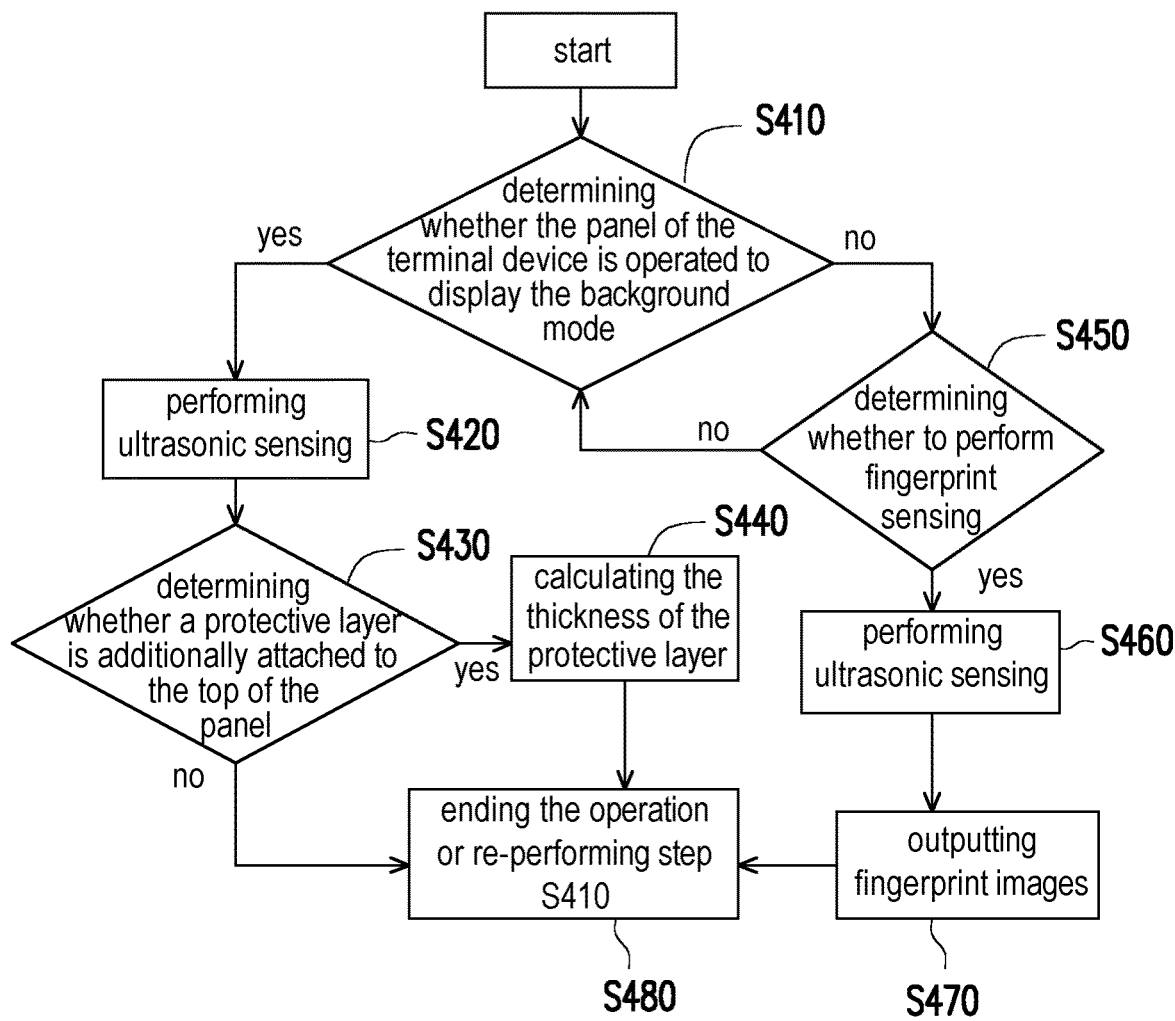
FIG. 4 is a flowchart of an operation method according to an embodiment of the disclosure.

FIG. 4 is a flowchart of an operation method according to an embodiment of the disclosure. Referring to FIG. 1 and FIG. 4, the operation method of the embodiment is adapted to be applied to the terminal device 10 of FIG. 1. In step S410, the ultrasonic fingerprint sensor 100 determines whether the panel 220 of the terminal device 10 is operated to display the background mode. If yes, the ultrasonic fingerprint sensor 100 performs step S420. If not, the ultrasonic fingerprint sensor 100 performs step S450. In step S420, the ultrasonic fingerprint sensor 100 performs ultrasonic sensing. In step S430, the ultrasonic fingerprint sensor 100 determines whether a protective layer is additionally attached to the top of the panel 220. If not, in step S480, the ultrasonic fingerprint sensor 100 directly performs step S480. In this regard, when the ultrasonic fingerprint sensing array 120 of the ultrasonic fingerprint sensor 100 only receives the first echo (the first reflected signal) corresponding to the test ultrasonic signal, the controller 110 of the ultrasonic fingerprint sensor 100 determines that the protective layer is not additionally attached to the top of the panel 220.

If yes, the ultrasonic fingerprint sensor 100 performs step S440 to calculate the thickness of the protective layer. In this regard, when the ultrasonic fingerprint sensing array 120 of the ultrasonic fingerprint sensor 100 receives the first echo (the first reflected signal) and the second echo (the second reflected signal) corresponding to the test ultrasonic signal in sequence, the controller 110 of the ultrasonic fingerprint sensor 100 determines that the protective layer is additionally attached to the top of the panel 220. In addition, the ultrasonic fingerprint sensor 100 updates, for example, the phase-delay parameter according to the thickness of the protective layer, and then performs step S480. In step S480, the ultrasonic fingerprint sensor 100 ends the operation or re-performs step S410 to continuously and automatically adjust the ultrasonic fingerprint sensor 100 so as to maintain a good sensing effect.

In step S450, the ultrasonic fingerprint sensor 100 determines whether to perform fingerprint sensing. If yes, the ultrasonic fingerprint sensor 100 performs steps S460 and S470 to perform ultrasonic sensing and output fingerprint images. If not, the ultrasonic fingerprint sensor 100 re- performs step S410. Note that since the terminal device 10 performs the background mode first when no user operates it, the ultrasonic fingerprint sensor 100 automatically determines whether the protective layer is additionally attached to the top of the panel 220 first, and calculates the thickness of the protective layer to adjust the ultrasonic fingerprint sensor 100. In other words, when the user operates the terminal device 10 to perform fingerprint sensing, the adjusted ultrasonic fingerprint sensor 100 is capable of providing a good sensing effect. Therefore, the operation method of the embodiment enables the terminal device 10 to implement an adaptive fingerprint sensing function.

Figure 5:
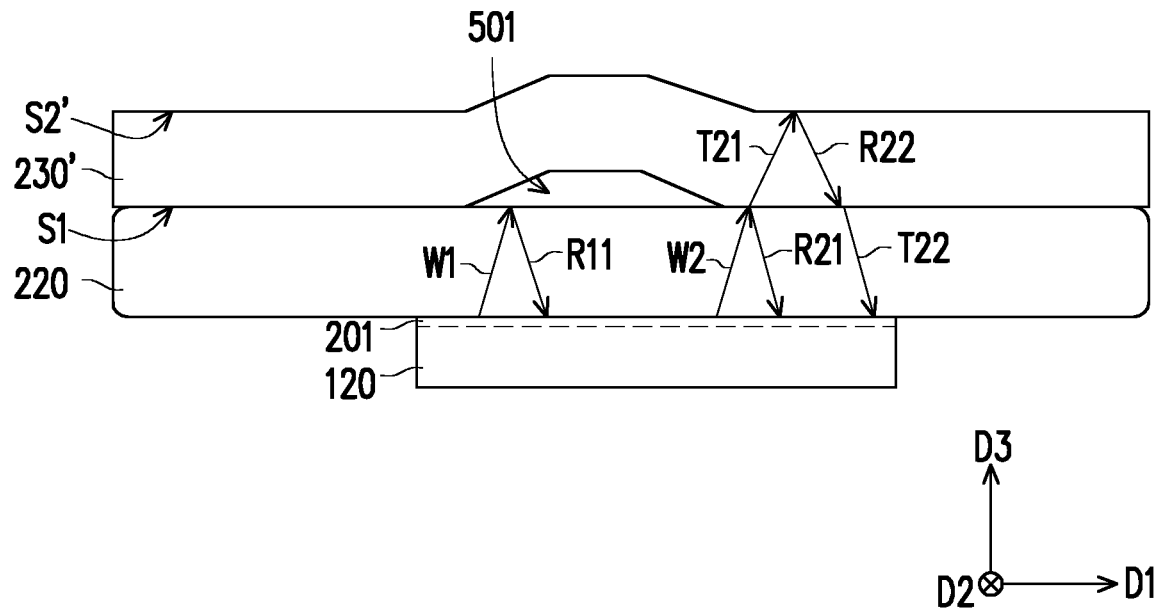
FIG. 5 is a schematic view of an ultrasonic fingerprint sensor and a panel attached with a protective layer according to another embodiment of the disclosure.

FIG. 5 is a schematic view of an ultrasonic fingerprint sensor and a panel attached with a protective layer according to another embodiment of the disclosure. Referring to FIG. 1 and FIG. 5, a protective layer 230' is additionally attached to the top of the panel 220 in the embodiment, and the protective layer 230' is not evenly attached to the top of the panel 220, so that a bubble 501 exists between the panel 220 and the protective layer 230'. In the embodiment, the ultrasonic fingerprint sensing array 120 includes a plurality of ultrasonic sensors, so the ultrasonic fingerprint sensing array 120 may, for example, transmit test ultrasonic signals W1 and W2 toward the direction D3. In the embodiment, the test ultrasonic signal W1 is incident to a position of the surface S1 of the panel 220 corresponding to the below of the bubble 501. The surface S1 of the panel 220 reflects a part of the test ultrasonic signal W1 to form a reflected signal R11. The reflected signal R11 is transmitted through the panel 220 and the adhesive layer 201 to the ultrasonic fingerprint sensing array 120 as the first echo. In the embodiment, since another part of the test ultrasonic signal W1 passes through the panel 220, diverges in the bubble 501, and is not effectively reflected, one ultrasonic sensor of the ultrasonic fingerprint sensing array 120 only receives one echo (the first echo).

However, compared to the test ultrasonic signal W1, the test ultrasonic signal W2 is incident to a position of the surface S1 of the panel 220 corresponding to a position where no bubbles exist. The surface S1 of the panel 220 reflects a part of the test ultrasonic signal W2 to form a reflected signal R21. The reflected signal R21 is transmitted through the panel 220 and the adhesive layer 201 to the ultrasonic fingerprint sensing array 120 as the first echo. In addition, another part of the test ultrasonic signal W2 passes through the panel 220 to form a penetrating signal T21 and also passes through the panel 220 to be transmitted to the protective layer 230', and a surface S2' of the protective layer 230' reflects a part of the penetrating signal T21 to form a reflected signal R22. The reflected signal R22 passes through the protective layer 230', and a part of the reflected signal R22 passes through the panel 220 to generate a penetrating signal T22. The penetrating signal T22 is transmitted through the panel 220 and the adhesive layer 201 to the ultrasonic fingerprint sensing array 120 as the second echo. Therefore, another ultrasonic sensor of the ultrasonic fingerprint sensing array 120 receives two echoes (the first echo and the second echo). In other words, the ultrasonic fingerprint sensor 100 in the embodiment determines whether the protective layer 230' is evenly attached to the top of the panel 220 according to whether the number of the echo signals received by at least a part of the plurality of the ultrasonic sensors of the ultrasonic fingerprint sensing array 120 is greater than one.

Figure 6:
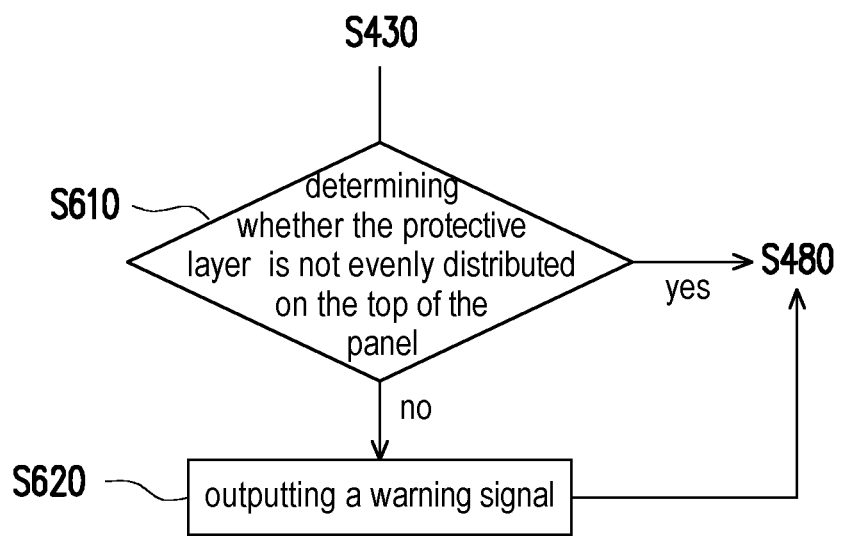
FIG. 6 is a flowchart of an operation method according to another embodiment of the disclosure.

FIG. 6 is a flowchart illustrating how to determine whether the protective layer is evenly attached to the top of the panel according to an embodiment of the disclosure. Referring to FIG. 1, FIG. 4, and FIG. 6, in step S430 of FIG.

4, when the ultrasonic fingerprint sensor 100 determines that a protective layer is additionally attached to the top of the panel 220, the ultrasonic fingerprint sensor 100 also performs step S610. In step S610, the ultrasonic fingerprint sensor 100 determines whether the protective layer is not evenly distributed (attached) on the top of the panel 220. If yes, the ultrasonic fingerprint sensor 100 performs step S480 to end the operation or re-perform step S410. If not, the ultrasonic fingerprint sensor 100 performs step S620 to output a warning signal to the processor 210 of the terminal device 10. Therefore, in the embodiment, when the terminal device 10 receives the warning signal, the terminal device 10 reminds the user according to the warning signal that the current protective layer attached to the top of the panel 220 may invalidate the fingerprint sensing function.

Figure 7A:
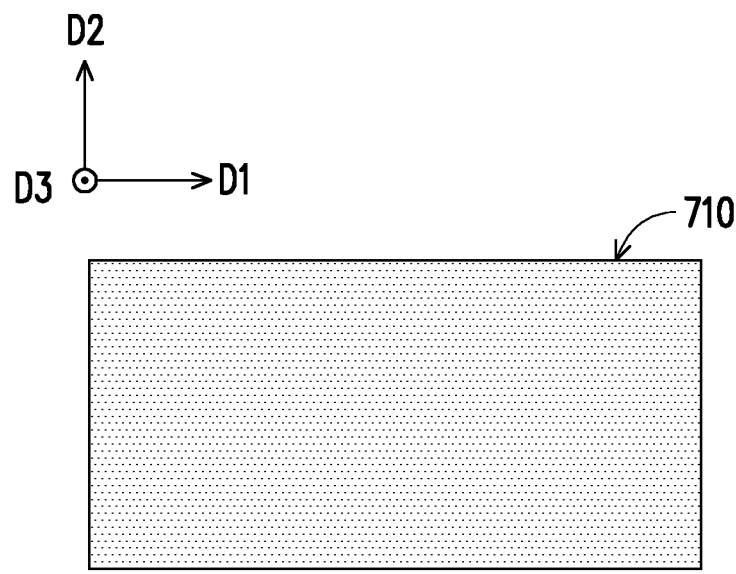
FIG. 7A is a schematic view of a background image according to an embodiment of the disclosure.
Figure 7B:
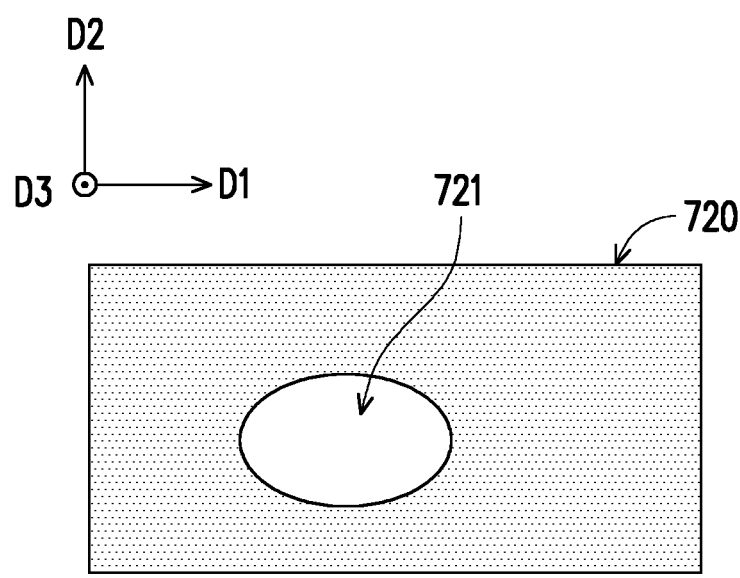
FIG. 7B is a schematic view of a background image according to another embodiment of the disclosure.

FIG. 7A is a schematic view of a background image according to an embodiment of the disclosure. FIG. 7B is a schematic view of a background image according to another embodiment of the disclosure. Referring to FIG. 1, FIG. 2B, and FIG. 7A, the processor 210 of the terminal device 10 obtains a background image 710 as shown in FIG. 7A based on the sensing result of the ultrasonic fingerprint sensing array 120. In this regard, since the protective layer 230 is evenly attached to the panel 220, and other objects (e.g., the finger of the user) have not been pressed on the top of the protective layer 230, the processor 210 may obtain, for example, the uniform grayscale background image 710 as shown in FIG. 7A. Referring to FIG. 1, FIG. 5, and FIG. 7B, the processor 210 of the terminal device 10 obtains a background image 720 as shown in FIG. 7B based on the sensing result of the ultrasonic fingerprint sensing array 120. In this regard, since the protective layer 230' is not evenly attached to the panel 220, and the bubble 501 exits, the processor 210 may obtain, for example, the non-uniform grayscale background image 720 as shown in FIG. 7B. Compared to the background image 710 in FIG. 7A, the background image 720 includes a bubble image area 721.

In the embodiment, the grayscale value of the bubble image area 721 (the blank area in FIG. 7B) is different from the grayscale value of the area (the dot area in FIG. 7B) outside the bubble image area 721. Therefore, the processor 210 of the terminal device 10 identifies the range of the bubble image area 721 by analyzing the change of the grayscale value of the background image 720 and further determines whether the area of the bubble image area 721 in the background image 720 is greater than or equal to the threshold area. If yes, the processor 210 of the terminal device 10 gives a warning. In other words, when the processor 210 of the terminal device 10 determines that the area of the bubble image area 721 has exceeded the threshold greatly enough to affect the reliability of fingerprint recognition, the processor 210 of the terminal device 10 gives a warning to remind the user that the current protective layer attached to the top of the panel 220 may invalidate the fingerprint sensing function. Conversely, when the processor 210 of the terminal device 10 determines that the area of the bubble image area 721 in the background image 720 is less than the area threshold and determines that the reliability of fingerprint recognition is barely affected, the processor 210 of the terminal device 10 does not give a warning.

Figure 8A:
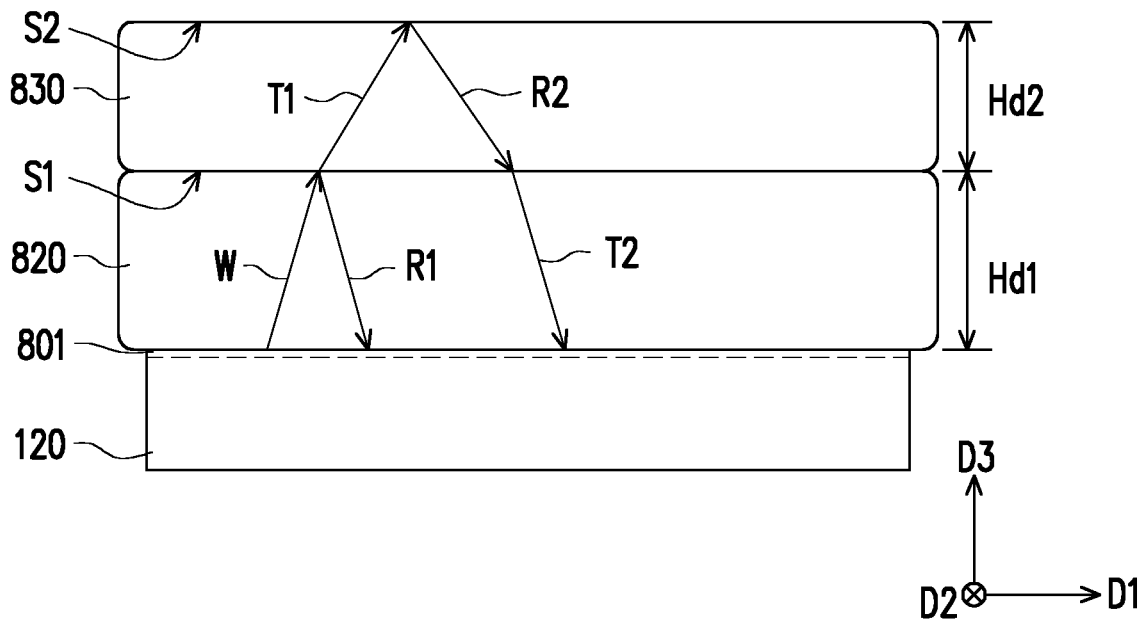
FIG. 8A is a schematic view of an ultrasonic fingerprint sensor and a multiple-layered panel without a protective layer according to an embodiment of the disclosure.
Figure 8B:
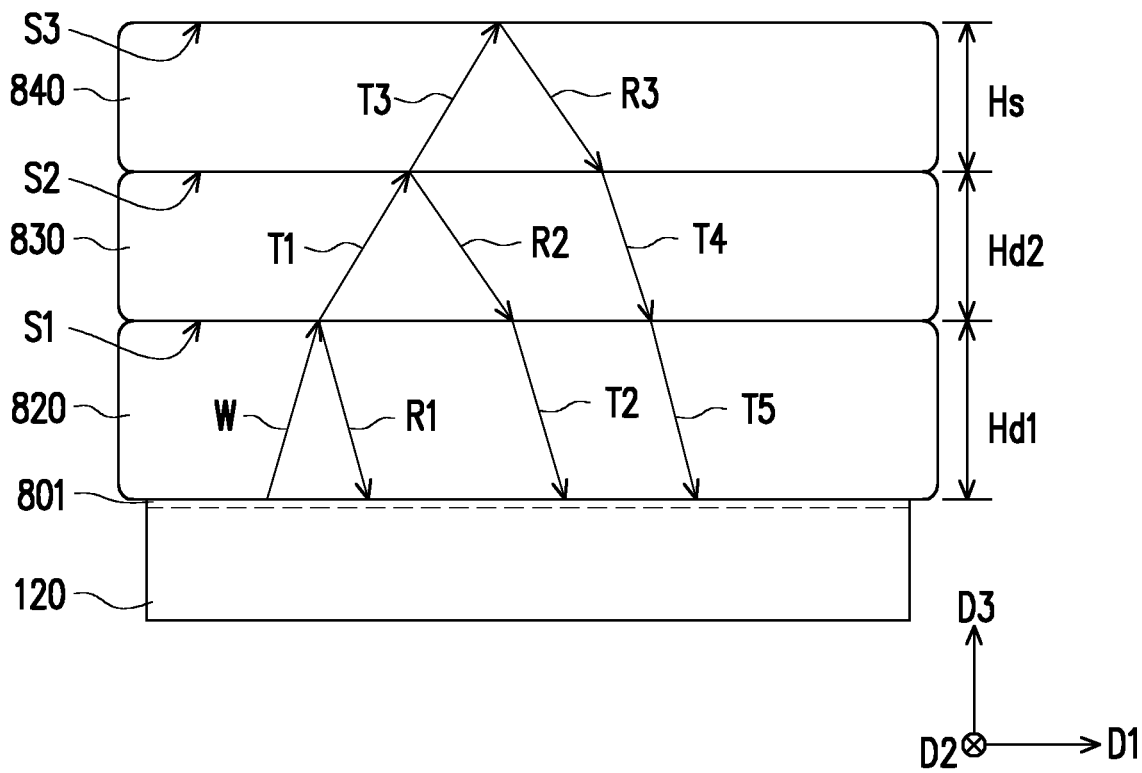
FIG. 8B is a schematic view of an ultrasonic fingerprint sensor and a multiple-layered panel attached with a protective layer according to an embodiment of the disclosure.

FIG. 8A is a schematic view of an ultrasonic fingerprint sensor and a multiple-layered panel without a protective layer according to an embodiment of the disclosure. FIG. 8B is a schematic view of an ultrasonic fingerprint sensor and a multiple-layered panel attached with a protective layer according to an embodiment of the disclosure. FIG. 9 is a signal timing diagram of the first echo, the second echo, and the third echo according to an embodiment of the disclosure. Referring to FIG. 1, FIG. 8A, and FIG. 9, the embodiment may be an extension of the embodiment in FIG. 2A. The panel in the embodiment has a two-layered structure, a first layer 820 and a second layer 830 of the panel as shown in FIG. 8A. In the embodiment, the ultrasonic fingerprint sensing array 120 is disposed under the first layer 820 of the panel through an adhesive layer 801, and no protective layer is additionally attached to the top of the second layer 830 of the panel. In the embodiment, the ultrasonic fingerprint sensing array 120 transmits the test ultrasonic signal W toward the direction D3, and the surface S1 of the first layer 820 of the panel reflects a part of the test ultrasonic signal W to form the reflected signal R1. The surface S2 of the second layer 830 of the panel reflects a part of the penetrating signal T1 to form the reflected signal R2. The reflected signal R2 passes through the second layer 830 of the panel, and a part of the reflected signal R2 passes through the first layer 820 of the panel to generate the penetrating signal T2. In this regard, the reflected signal R1 is transmitted through the first layer 820 and the adhesive layer 801 of the panel to the ultrasonic fingerprint sensing array 120 as the first echo. The reflected signal R2 passes through the first layer 820, the second layer 830, and the adhesive layer 801 of the panel and is transmitted to the ultrasonic fingerprint sensing array 120 as a second echo.

In the embodiment, since the finger of the user is not placed or pressed on the top of the second layer 830 of the panel (i.e., air is above the second layer 830 of the panel), another part of the penetrating signal T1 passes through the second layer 830 of the panel and diverges. In other words, the ultrasonic fingerprint sensing array 120 only receives two echoes (the first echo and the second echo) represented by the reflected signal R1 and the reflected signal R2, and the controller 110 only receives the first echo signal 901 and the second echo signal 902 (shown in FIG. 9) provided by the ultrasonic fingerprint sensing array 120.

Referring to FIG. 1, FIG. 8B, and FIG. 9, the embodiment may be an extension of the embodiment in FIG. 2B. In the embodiment, a protective layer 840 (or a protective sticker) is additionally attached to the top of the second layer 830 of the panel. In the embodiment, the ultrasonic fingerprint sensing array 120 transmits the test ultrasonic signal W toward the direction D3, and the surface S1 of the first layer 820 of the panel reflects a part of the test ultrasonic signal W to form the reflected signal R1. A surface S2 of the second layer 830 of the panel reflects a part of the penetrating signal T1 to form the reflected signal R2. The reflected signal R2 passes through the second layer 830 of the panel, and a part of the reflected signal R2 passes through the first layer 820 of the panel to generate the penetrating signal T2. Another part of the penetrating signal T1 passes through the protective layer 840 to form a penetrating signal T3. A surface S3 of the protective layer 840 reflects a part of the penetrating signal T3 to form a reflection signal R3. The reflected signal R3 passes through the protective layer 840, and a part of the reflected signal R3 passes through the second layer 830 of the panel to generate a penetrating signal T4. The penetrating signal T4 passes through the second layer 830 of the panel, and a part of the penetrating signal T4 passes through the first layer 820 of the panel to generate a penetrating signal T5. In other words, the reflected signal R1 is transmitted through the first layer 820 and the adhesive layer 801 of the panel to the ultrasonic fingerprint sensing array 120 as the first echo. The reflected signal R2 passes through the first layer 820, the second layer 830, and the adhesive layer 801 of the panel and is transmitted to the ultrasonic fingerprint sensing array 120 as the second echo. The reflected signal R3 passes through the first layer 820, the second layer 830, the protective layer 840, and the adhesive layer 801 of the panel and is transmitted to the ultrasonic fingerprint sensing array 120 as the third echo.

In other words, comparing the embodiments of FIG. 8A and FIG. 8B, it can be seen that if the ultrasonic fingerprint sensing array 120 receives three echoes (the first echo represented by the reflected signal R1, the second echo represented by the penetrating signal T2, and the third echo represented by the penetrating signal T4) in sequence (in a time-sharing manner) and provides the first echo signal 901 to the third echo signal 903 to the controller 110 in sequence (in a time-sharing manner), this means that the protective layer 840 is additionally attached to the top of the second layer 830 of the panel. Note that the signal amplitude of the first echo signal 901 is greater than or equal to the signal amplitude of the second echo signal 902, and the signal amplitude of the second echo signal 902 is greater than or equal to the signal amplitude of the third echo signal 903. Conversely, if the ultrasonic fingerprint sensing array 120 only receives two echoes (the first echo represented by the reflected signal R1 and the second echo represented by the penetrating signal T2) as shown in FIG. 8A and only provides the first echo signal 901 and the second echo signal 902 to the controller 110, this means that the protective layer 840 is not additionally attached to the top of the second layer 830 of the panel. Therefore, the controller 110 effectively determines whether the protective layer 840 is additionally attached to the top of the panel based on whether the number of the echo signals corresponding to the test ultrasonic signal W is greater than the preset number of panel layers (known).

Moreover, in the embodiment, the controller 110 further calculates the thickness Hs of the protective layer 840. Specifically, as shown in FIG. 8B and FIG. 9, the time difference to is between the time when the ultrasonic fingerprint sensing array 120 transmits the test ultrasonic signal W and the time when the ultrasonic finger print sensing array 120 receives the first echo to generate the first echo signal 901. The time difference tb is between the time when the ultrasonic fingerprint sensing array 120 transmits the test ultrasonic signal W and the time when the ultrasonic finger print sensing array 120 receives the second echo to generate the second echo signal 902. The time difference tc is between the time when the ultrasonic fingerprint sensing array 120 transmits the test ultrasonic signal W and the time when the ultrasonic finger print sensing array 120 receives the third echo to generate the third echo signal 903. The controller 110 calculates the thickness Hs of the protective layer 840 according to the time differences ta, tb, and tc of when the first echo, the second echo, and the third echo are received by the ultrasonic fingerprint sensing array 120.

Note that the calculation method for calculating the thickness of the protective layer 840 in the embodiment may be an extended concept of the embodiment in FIG. 2B, and accordingly multiple simultaneous equations are established for performing calculations, so it is not iterated. In addition, the method of determining whether the protective layer 840 is attached to the multi-layered panel in the embodiments of FIG. 8A and FIG. 8B may also be implemented by the operation method of the embodiment of FIG. 4. In this regard, when the number of the echo signals corresponding to the test ultrasonic signal W received by the ultrasonic fingerprint sensing array 120 is different from the preset number of panel layers, the controller 110 determines that the protective layer 840 is attached to the top of the panel. When the number of the echo signals corresponding to the test ultrasonic signal W received by the ultrasonic fingerprint sensing array 120 is equal to the preset number of panel layers, the controller 110 determines that the protective layer 840 is not attached to the top of the panel.

FIG. 10 is a schematic view of an ultrasonic fingerprint sensor and a multiple-layered panel attached with a protective layer according to another embodiment of the disclosure. Referring to FIG. 1 and FIG. 10, a protective layer 840' is additionally attached to the top of the second layer 830 of the panel in the embodiment, and the protective layer 840' is not evenly attached to the top of the second layer 830 of the panel, so that the a bubble 1001 exits between the second layer 830 and the protective layer 840' of the panel. In the embodiment, the ultrasonic fingerprint sensing array 120 may include a plurality of ultrasonic sensors, so the ultrasonic fingerprint sensing array 120 may, for example, transmit the test ultrasonic signals W1 and W2 toward the direction D3. In the embodiment, the test ultrasonic signal W1 is incident to the surface S1 of the first layer 820 of the panel. The surface S1 of the first layer 820 of the panel reflects a part of the test ultrasonic signal W1 to form the reflected signal R11. The reflected signal R11 is transmitted through the first layer 820 and the adhesive layer 801 of the panel to the ultrasonic fingerprint sensing array 120 as the first echo. In addition, another part of the test ultrasonic signal W1 passes through the first layer 820 of the panel to form a penetrating signal T11, then passes through the second layer 830 of the panel, and is transmitted to the position corresponding to the bubble 801, and the surface S2' of the second layer 830 of the panel reflects a part of the penetrating signal T11 to form a reflected signal R12. A part of the reflected signal R12 passes through the first layer 820 of the panel to generate a penetrating signal T12. The penetrating signal T12 is transmitted through the first layer 820 and the adhesive layer 801 of the panel to the ultrasonic fingerprint sensing array 120 as the second echo. In the embodiment, since another part of the penetrating signal T11 passes through the second layer 830 of the panel, diverges in the bubble 1001, and is not reflected in an effective manner, one ultrasonic sensor of the ultrasonic fingerprint sensing array 120 only receives two echoes (the first echo and the second echo).

However, compared to the test ultrasonic signal W1, the test ultrasonic signal W2 is incident to the surface S1 of the first layer 820 of the panel. The surface S1 of the panel 220 reflects a part of the test ultrasonic signal W2 to form the reflected signal R21. The reflected signal R21 is transmitted through the first layer 820 and the adhesive layer 801 of the panel to the ultrasonic fingerprint sensing array 120 as the first echo. In addition, another part of the test ultrasonic signal W2 passes through the first layer 820 of the panel to form the penetrating signal T21, then passes through the second layer 830 of the panel, and is transmitted to a position of the protective layer 840 corresponding to where no bubble 801 exists to form a penetrating signal T23. The surface S2' of the second layer 830 of the panel reflects a part of the penetrating signal T21 to form the reflected signal R22. The reflected signal R22 passes through the second layer 830 of the panel, and a part of the reflected signal R22 passes through the first layer 820 of the panel to generate the penetrating signal T22. The penetrating signal T22 is transmitted through the first layer 820 and the adhesive layer 801 of the panel to the ultrasonic fingerprint sensing array 120 as the second echo. Another part of the penetrating signal T21 passes through the surface S3 of the second layer 830 of the panel and then passes through the second layer 830 of the panel to form the penetrating signal T23. A surface S3' of the protective layer 840' reflects a part of the penetrating signal T23 to form a reflection signal R23. The reflected signal R23 passes through the protective layer 840' and then passes through the second layer 830 of the panel to generate a penetrating signal T24. The penetrating signal T24 passes through the first layer 830 of the panel to generate a penetrating signal T25. The penetrating signal T25 is transmitted through the first layer 820 and the adhesive layer 801 of the panel to the ultrasonic fingerprint sensing array 120 as the third echo.

Therefore, another ultrasonic sensor of the ultrasonic fingerprint sensing array 120 receives three echoes (the first echo, the second echo, and the third echo). In other words, the ultrasonic fingerprint sensor 100 in the embodiment determines whether the protective layer 840' is evenly attached to the top of the second layer 823 of the panel according to whether the number of the echo signals received by at least a part of the plurality of the ultrasonic sensors of the ultrasonic fingerprint sensing array 120 is greater than the preset number of the panel layers.

Note that when the protective layer 840' of the panel with a multi-layered structure is not evenly attached to the top of the protective layer of the panel with a multi-layered structure, the ultrasonic fingerprint sensor 100 may also perform the process of the embodiment shown in FIG. 6 to give a warning signal. In addition, the processor 210 may also obtain the background images 710 and 720 of the panel with a multi-layered structure shown in FIG. 7A and FIG. 7B to determine whether the area of the bubble image area 721 exceeds the threshold greatly enough to affect the reliability of fingerprint recognition, and thereby giving a warning.

Based on the above, the ultrasonic fingerprint sensor and the operating method thereof in the disclosure are capable of determining whether a protective layer is attached to the top of the panel through the number of echoes, for example, one echo or two echoes, received by the ultrasonic fingerprint sensing array in an effective manner. Moreover, the thickness of the protective layer is further calculated, and the ultrasonic fingerprint sensing array is updated or adjusted adaptively. In addition, the ultrasonic fingerprint sensor and the operation method thereof in the disclosure are capable of determining whether the protective layer is evenly distributed on the panel, so as to determine whether to give a warning to the user to remind the user to remove or modify the protective layer. Therefore, the ultrasonic fingerprint sensor and the operation method thereof in the disclosure provide an effective ultrasonic fingerprint sensing function.

Although the disclosure has been described with reference to the above embodiments, it will be apparent to one of ordinary skill in the art that modifications to the described embodiments may be made without departing from the spirit and the scope of the disclosure. Accordingly, the scope of the disclosure will be defined by the attached claims and their equivalents and not by the above detailed descriptions.

What is claimed is:

1. An ultrasonic fingerprint sensor adapted to be disposed under a panel of a terminal device, wherein the ultrasonic fingerprint sensor comprises:
   an ultrasonic fingerprint sensing array transmitting a test ultrasonic signal toward the panel; and
   a controller circuit coupled to the ultrasonic fingerprint sensing array,
   wherein the controller circuit determines whether a protective layer is attached to a top of the panel based on a number of echo signals corresponding to the test ultrasonic signal.

2. The ultrasonic fingerprint sensor according to claim 1, wherein when the ultrasonic fingerprint sensing array only receives a first echo corresponding to the test ultrasonic signal, the controller circuit determines that a protective layer is not attached to the top of the panel, and
   wherein when the ultrasonic fingerprint sensing array receives the first echo and a second echo corresponding to the test ultrasonic signal in sequence, the controller circuit determines that the protective layer is additionally attached to the top of the panel.

3. The ultrasonic fingerprint sensor according to claim 2, wherein the controller circuit receives a first echo signal and a second echo signal corresponding to the first echo and the second echo provided by the ultrasonic fingerprint sensing array, and a signal amplitude of the first echo signal is greater than a signal amplitude of the second echo signal.

4. The ultrasonic fingerprint sensor according to claim 2, wherein a first surface of the panel reflects a part of the test ultrasonic signal to form a first reflected signal, and the ultrasonic fingerprint sensing array receives the first reflected signal as the first echo, and
   wherein a second surface of the protective layer reflects another part of the test ultrasonic signal to form a second reflected signal, and the ultrasonic fingerprint sensing array receives the second reflected signal as the second echo.

5. The ultrasonic fingerprint sensor according to claim 1, wherein when the controller circuit determines that the number of the echo signals is greater than one, the controller circuit calculates a thickness of the protective layer according to a time difference between receiving the echoes.

6. The ultrasonic fingerprint sensor according to claim 5, wherein the controller circuit updates a phase-delay parameter of the ultrasonic fingerprint sensing array for transmitting beamforming according to the thickness of the protective layer.

7. The ultrasonic fingerprint sensor according to claim 5, wherein the controller circuit determines whether the thickness of the protective layer is greater than a thickness threshold to output a warning signal.

8. The ultrasonic fingerprint sensor according to claim 5, wherein the ultrasonic fingerprint sensing array comprises a plurality of ultrasonic sensors, and the controller circuit determines whether the protective layer is evenly distributed on the panel according to whether the number of the echo signals received by at least a part of the plurality of the ultrasonic sensors is greater than one.

9. The ultrasonic fingerprint sensor according to claim 1, wherein when the controller circuit determines that the number of the echo signals is greater than one, the terminal device obtains a background image through the ultrasonic fingerprint sensing array and compares an area of a bubble image area in the background image to an area threshold.

10. The ultrasonic fingerprint sensor according to claim 9, wherein when the area of the bubble image area is greater than or equal to the area threshold, the terminal device gives a warning.

11. The ultrasonic fingerprint sensor according to claim 1, wherein the controller circuit predetermines whether the panel of the terminal device is operated to display a background mode, so that the test ultrasonic signal is transmitted toward the panel.

12. The ultrasonic fingerprint sensor according to claim 1, wherein the controller circuit determines whether the protective layer is attached to the top of the panel based on whether the number of the echo signals corresponding to the test ultrasonic signal is equal to a preset number of panel layers.

13. The ultrasonic fingerprint sensor according to claim 12, wherein when the controller circuit determines that the number of the echo signals corresponding to the test ultrasonic signal is different from the preset number of the panel layers, the controller circuit determines that the protective layer is attached to the top of the panel, and wherein when the controller circuit determines that the number of the echo signals corresponding to the test ultrasonic signal is equal to the preset number of the panel layers, the controller circuit determines that the protective layer is not attached to the top of the panel.

14. The ultrasonic fingerprint sensor according to claim 13, wherein when the controller circuit determines that the number of the echo signals is greater than the preset number of the panel layers, the controller circuit calculates a thickness of the protective layer according to a plurality of time differences between receiving the echoes.

15. The ultrasonic fingerprint sensor according to claim 14, wherein the ultrasonic fingerprint sensing array comprises a plurality of ultrasonic sensors, and the controller circuit determines whether the protective layer is evenly distributed on the panel according to whether the number of the echo signals received by at least a part of the plurality of the ultrasonic sensors is greater than the preset number of the panel layers.

16. The ultrasonic fingerprint sensor according to claim 12, wherein when the controller circuit determines that the number of the echo signals is greater than the preset number of the panel layers, the terminal device obtains a background image through the ultrasonic fingerprint sensing array and compares an area of a bubble image area in the background image to an area threshold.

17. The ultrasonic fingerprint sensor according to claim 16, wherein when the area of the bubble image area is greater than or equal to the area threshold, the terminal device gives a warning.

18. An operation method of an ultrasonic fingerprint sensor, wherein the ultrasonic fingerprint sensor is adapted to be disposed under a panel of a terminal device, and the operation method comprises:

transmitting a test ultrasonic signal toward the panel through an ultrasonic fingerprint sensing array; and determining whether a protective layer is attached to a top of the panel based on a number of echo signals corresponding to the test ultrasonic signal.

19. The operation method according to claim 18, wherein the step of determining whether the protective layer is attached to the top of the panel based on the number of the echo signals corresponding to the test ultrasonic signal comprises:

determining that a protective layer is not additionally attached to the top of the panel when the ultrasonic fingerprint sensing array only receives a first echo corresponding to the test ultrasonic signal; and determining that the protective layer is additionally attached to the top of the panel when the ultrasonic fingerprint sensing array receives the first echo and a second echo corresponding to the test ultrasonic signal in sequence.

20. The operation method according to claim 19, wherein the ultrasonic fingerprint sensing array generates a first echo signal and a second echo signal according to receiving the first echo and the second echo, and a signal amplitude of the first echo signal is greater than a signal amplitude of the second echo signal.

21. The operation method according to claim 19, wherein a first surface of the panel reflects a part of the test ultrasonic signal to form a first reflected sound wave, and the ultrasonic fingerprint sensing array receives the first reflected sound wave as the first echo, and wherein a second surface of the protective layer reflects another part of the test ultrasonic signal to form a second reflected sound wave, and the ultrasonic fingerprint sensing array receives the second reflected sound wave as the second echo.

22. The operation method according to claim 19, wherein when the number of the echo signals is greater than one, the operation method further comprises:

calculating a thickness of the protective layer according to a time difference between receiving the echoes.

23. The operation method according to claim 22, wherein when the number of the echo signals is greater than one, the operation method further comprises:

updating a phase-delay parameter of the ultrasonic fingerprint sensing array for transmitting beamforming according to the thickness of the protective layer.

24. The operation method according to claim 22, wherein when it is determined that the protective layer is additionally attached to the top of the panel, the operation method further comprises:

determining whether the thickness of the protective layer is greater than a thickness threshold to output a warning signal.

25. The operation method according to claim 22, wherein when it is determined that the protective layer is additionally attached to the top of the panel, the operation method further comprises:

determining whether the protective layer is evenly distributed on the panel according to whether the number of the echo signals received by at least a part of the ultrasonic fingerprint sensing array is greater than one.

26. The operation method according to claim 18, wherein when it is determined that the number of the echo signals is greater than one, the operation method further comprises:

obtaining a background image through the ultrasonic fingerprint sensing array; and comparing an area of a bubble image area in the background image to an area threshold.

27. The operation method according to claim 26, wherein when the area of the bubble image area is greater than or equal to the area threshold, the terminal device gives a warning.

28. The operation method according to claim 18 further comprising:

predetermining whether the panel of the terminal device is operated to display a background mode, so that the test ultrasonic signal is transmitted toward the panel.

29. The operation method according to claim 18, wherein the step of determining whether the protective layer is attached to the top of the panel based on the number of the echo signals corresponding to the test ultrasonic signal comprises:

determining whether the protective layer is attached to the top of the panel based on whether the number of the echo signals corresponding to the test ultrasonic signal is equal to a preset number of panel layers.

30. The operation method according to claim 29, wherein the step of determining whether the protective layer is attached to the top of the panel based on whether the number of the echo signals corresponding to the test ultrasonic signal is equal to the preset number of the panel layers comprises:

determining that the protective layer is attached to the top of the panel when the number of the echo signals corresponding to the test ultrasonic signal received by the ultrasonic fingerprint sensing array is different from the preset number of the panel layers, and determining that the protective layer is not attached to the top of the panel when the number of the echo signals corresponding to the test ultrasonic signal received by the ultrasonic fingerprint sensing array is equal to the preset number of the panel layers.

31. The operation method according to claim 30, wherein when the number of the echo signals is greater than the preset number of the panel layers, the operation method further comprises:

calculating a thickness of the protective layer according to a plurality of time differences between receiving the echoes.

32. The operation method according to claim 31, wherein when it is determined that the protective layer is additionally attached to the top of the panel, the operation method further comprises:

determining whether the protective layer is evenly distributed on the panel according to whether the number of the echo signals received by at least a part of the ultrasonic fingerprint sensing array is greater than the preset number of the panel layers.

33. The operation method according to claim 29, wherein when it is determined that the number of the echo signals is greater than the preset number of the panel layers, the operation method further comprises:

obtaining a background image through the ultrasonic fingerprint sensing array; and comparing an area of a bubble image area in the background image to an area threshold.

34. The operation method according to claim 33, wherein when the area of the bubble image area is greater than or equal to the area threshold, the terminal device gives a warning.

\* \* \* \* \*